United States Patent
Gotham et al.

(10) Patent No.: US 6,505,940 B1
(45) Date of Patent: Jan. 14, 2003

(54) DIGITAL PROJECTOR

(75) Inventors: David R. Gotham, Rochester, NY (US); Paul W. Porter, Victor, NY (US); Samuel F. Swayze, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 51 days.

(21) Appl. No.: 09/703,054

(22) Filed: Oct. 31, 2000

(51) Int. Cl.$^7$ .............................................. G03B 21/00
(52) U.S. Cl. ...................................................... 353/119
(58) Field of Search ........................... 353/119, 98, 122

(56) References Cited

U.S. PATENT DOCUMENTS

| | | | | |
|---|---|---|---|---|
| 2,847,904 A | * | 8/1958 | Nosco ........................ 353/119 |
| 4,202,015 A | | 5/1980 | Udo et al. .................... 358/237 |
| 4,652,101 A | | 3/1987 | Grunwald .................... 353/122 |
| 4,756,604 A | | 7/1988 | Nakatsuka et al. ..... 350/331 R |
| 4,832,461 A | | 5/1989 | Yamagishi et al. ..... 350/347 E |
| D314,570 S | | 2/1991 | Newman .................... D14/126 |
| 5,459,539 A | * | 10/1995 | Yamamoto .................. 353/119 |
| 5,550,604 A | | 8/1996 | Gale et al. .................... 353/31 |
| 5,605,390 A | * | 2/1997 | Brice et al. .................. 353/119 |
| 5,630,659 A | | 5/1997 | Ronzani et al. .............. 353/15 |
| 5,642,927 A | * | 7/1997 | Booth et al. ................. 353/119 |
| 5,742,358 A | | 4/1998 | Iijima et al. .................. 348/789 |
| 5,889,614 A | | 3/1999 | Cobben et al. .............. 359/483 |
| D413,116 S | | 8/1999 | Ishikawa .................... D14/128 |
| 5,993,012 A | * | 11/1999 | Buchanan et al. ........... 353/119 |
| 6,283,600 B1 | * | 9/2001 | Levasseur .................... 353/119 |
| ,011,818 A1 | * | 2/2002 | Sea-Huang et al. ........... 353/87 |

* cited by examiner

Primary Examiner—William Dowling
(74) Attorney, Agent, or Firm—Peyton C. Watkins

(57) ABSTRACT

A digital projector for providing digital images for display to a user, the digital projector comprises a housing having its vertical dimension substantially greater than its horizontal dimension; a light source enclosed within the housing for providing light; a digital imager through which the light of the light source is projected for providing digital images for display to the user; a single mirror for reflecting the digital image from the digital imager; and a lens for receiving the digital image from the digital imager for display external to the digital projector; and a plurality of wheels attached to the base for providing efficient movement of the digital projector.

5 Claims, 2 Drawing Sheets

DIGITAL PROJECTOR

FIELD OF THE INVENTION

This invention relates to LCD digital projectors, and more particularly, to such digital projectors having a compact housing that uses a single reflective mirror.

BACKGROUND OF THE INVENTION

Currently, there are a variety of low-cost, LCD digital image projectors for use by consumers. Typically, these low-cost, LCD digital projectors include a large rectangular base having a light source therein for providing light. The light is passed through a LCD imager, which electronically provides the digital image, and then through a plurality of reflective mirrors as is well known in the art. The digital image is then projected through a focusing lens that projects the digital image external to the digital projector for display to the user.

Although the currently known and utilized digital projectors are satisfactory, they include drawbacks. In order for the digital image to have all the components necessary for eventual display, the plurality of reflective mirrors are used so that the light can be passed through all the necessary components and still be contained within a relatively small area.

Consequently, a need exits for an improved digital projector that is compact and reduces the need the number of reflective mirrors used.

SUMMARY OF THE INVENTION

A digital projector for providing digital images for display to a user, the digital projector comprises (a) a housing having its vertical dimension substantially greater than its horizontal dimension; (b) a light source enclosed within the housing for providing light; (c) a digital imager through which the light of the light source is projected for providing digital images for display to the user; (d) a single mirror for reflecting the digital image from the digital imager; and (e) a lens for receiving the digital image from the digital imager for display external to the digital projector; and (f) a plurality of wheels attached to the base for providing efficient movement of the digital projector.

ADVANTAGEOUS EFFECT OF THE INVENTION

It is an advantageous feature of at least one embodiment of the invention in which the digital projector is compact with a reduced number of mirrors.

BRIEF DESCRIPTION OF THE DRAWINGS

The above mentioned in other features an object of this invention and a matter of obtaining it will become more apparent, and image itself will be better understood our reference to the following description of the embodiment of invention taking in conjunction with the accompanying figures wherein.

DETAILED DESCRIPTION OF THE INVENTION

Figure 1:
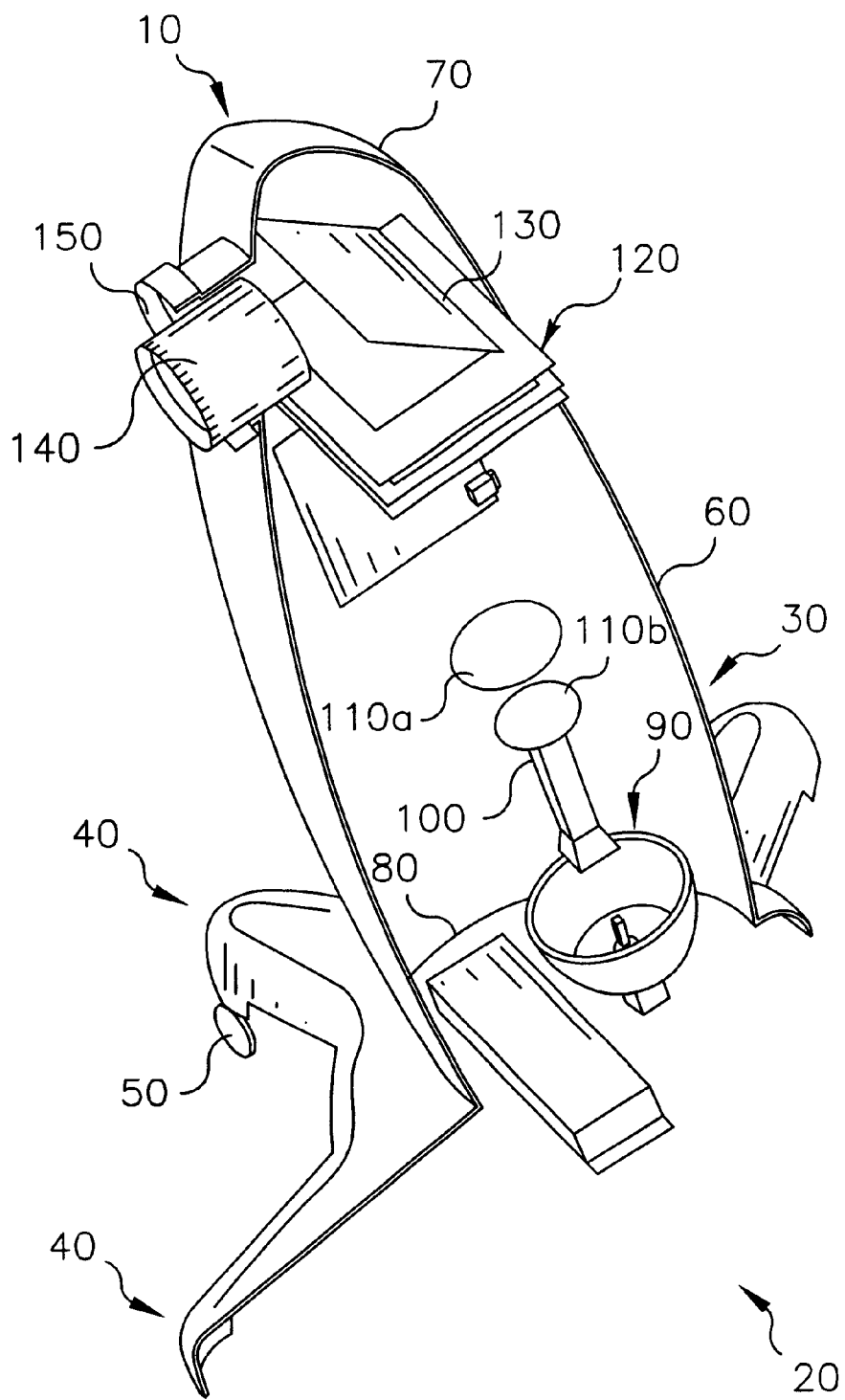
FIG. 1 is a prospective view of the digital projector with a portion cutaway.
Figure 2:
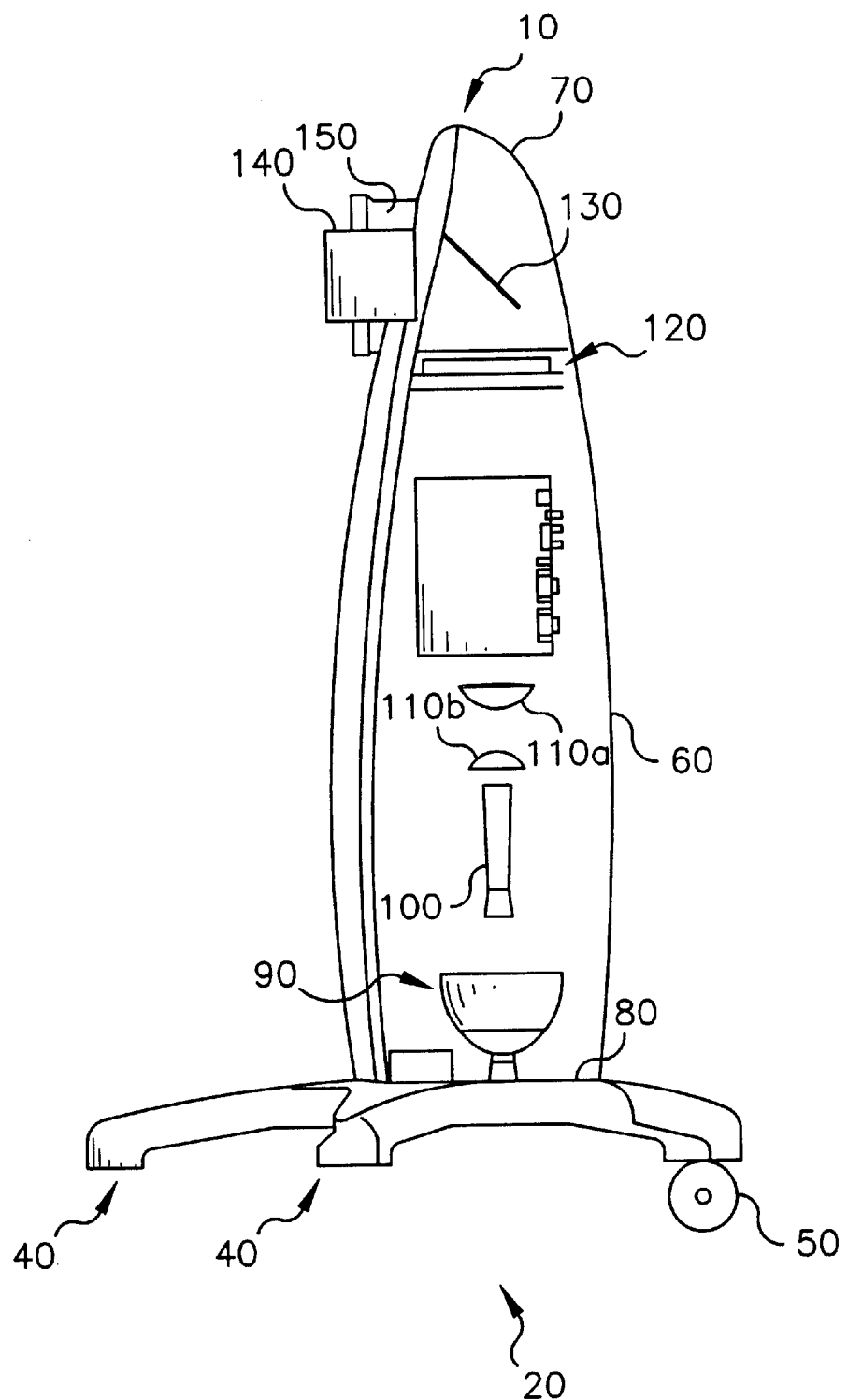
FIG. 2 is a side view with a portion cutaway.

Referring to FIGS. 1 and 2, there is shown a housing 10 for a digital projector 20 having a base portion 30 which forms the foundation of the digital projector 20. A plurality of feet 40 are attached to the base portion 30 each of which includes a wheel 50 for providing efficient mobility of the digital projector 20. The housing 10 also includes a middle portion 60 and a head portion 70. When in its operating position, a bottom portion 80 of the base portion 30 and the feet 40 are substantially parallel to the earth's surface for providing adequate stabilizing, support and transporting of the housing 10. As is obvious, the housing 10 is substantially longer in its dimension perpendicular to the earth's surface than in the dimension parallel to the earth's surface. In other words, a vertical shaped housing 10 having its vertical dimension substantially greater than its horizontal dimension.

A light source 90 is disposed at the bottom portion 80 of the base 30 for providing light for displaying the digital image. The light source 90 is connected to an external power source for energizing the light source 90, as is well known in the art and will not be described herein.

A light pipe 100 is disposed in the middle portion 60 of the housing 10 and adjacent to the light source 90 for collecting the light from the light source 90 and directing its direction. Two lenses 110a, 110b are positioned upwardly over the light pipe 100 for receiving the light from the light pipe 100 and for adjusting the size and intensity of the image to be displayed by the light.

A LCD imager 120 is positioned in the head portion 70 of the housing 10. The LCD imager 120 electronically provides the digital images to be displayed by the projector 20, as is well known in the art, and is positioned over the lenses 110a, 110b for receiving the light from the lenses 110a, 110b. The light passes through the LCD imager 120 and onto a reflective mirror 130 that reflects the digital image through a focusing lens 140. As is obvious to those skilled in the art, the reflective mirror 130 reflects or bends the light so that it passes properly through the focusing lens 140. In the preferred embodiment, the light source and reflective mirror are positioned in a spaced-part relationship.

The head portion 70 includes a cutaway portion 150 through which the lens 140 is projected therethrough for permitting the light to be passed out of the housing 10 via the focusing lens 140. The focusing lens 140 focuses the digital image on a surface (not shown) external to the digital projector for display to the user.

The invention has been described in detail with particular reference to certain preferred embodiment thereof, but it should be appreciated that variations and modifications can be affected within the scope and spirit of the invention.

PARTS LIST 10 housing
20 digital projector
30 base portion
40 feet
50 wheels
60 middle portion
70 head portion
80 bottom portion
90 light source
100 light pipe
110a lens
110b lens
120 LCD imager
130 reflective mirror
140 focusing lens
150 cutaway portion

What is claimed is:

1. A digital projector for providing digital images for display to a user, the digital projector comprising:
   (a) a housing having a base portion with its vertical dimension substantially greater than a horizontal dimension of a head portion when both the base portion and head portion are in their normal operating position;
   the base portion comprising:
      (i) a light source enclosed within the housing for providing light; the head portion comprising:
         (i) a digital imager through which the light of the light source is projected for providing digital images for display to the user;
         (ii) a single mirror for reflecting the digital image from the digital imager;
         (iii) a lens for receiving the digital image from the digital imager for display external to the digital projector, and
   (b) a plurality of wheels attached to the housing for providing efficient movement of the digital projector.

2. The digital projector as in claimed 1, wherein the housing, when in its operating position, includes having its dimension perpendicular to earth's surface substantially greater than its dimension parallel to the earth's surface.

3. The digital projector as in claim 2, wherein the light source is positioned at the base of the housing, and the single lens is positioned in a spaced-apart relationship from the light source at a head portion of the housing.

4. The digital projector as in claim 3, further comprising a light pipe disposed adjacent to light source for collecting the light from the light source and passing the light to the reflective mirror.

5. The digital projector as in claim 1, wherein the light source and the single mirror are positioned in a spaced-apart relationship.

* * * * *